H. H. YOUNG.
Sewer-Traps.
No. 152,450. Patented June 23, 1874.
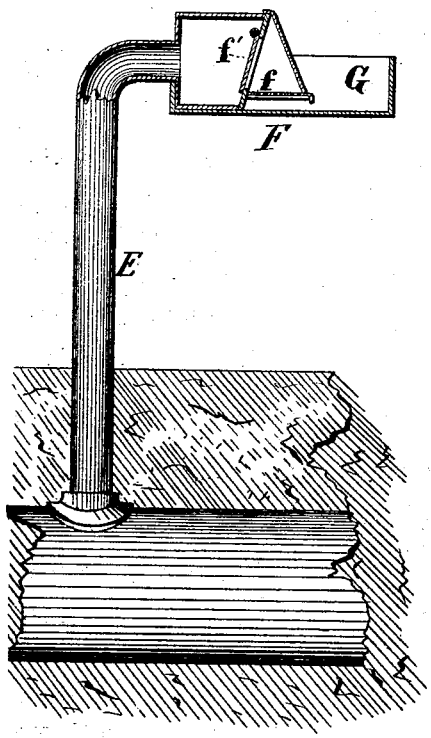
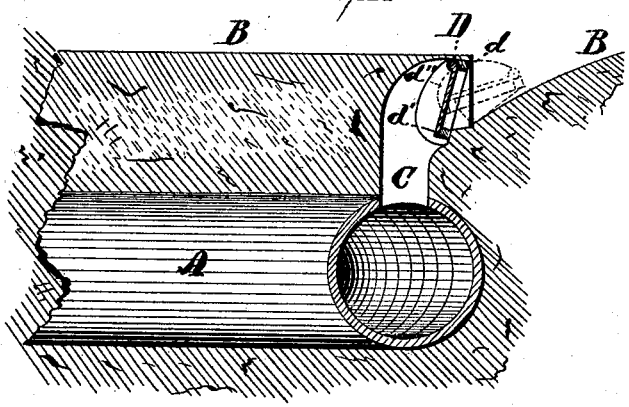
WITNESSES
W. T. Newman
Robt. M. Barr
INVENTOR
Henry H. Young.
By Leggett & Leggett,
Attorneys.

UNITED STATES PATENT OFFICE.

HENRY H. YOUNG, OF NEWPORT, RHODE ISLAND.

IMPROVEMENT IN SEWER-TRAPS.

Specification forming part of Letters Patent No. 152,450, dated June 23, 1874; application filed June 9, 1874.

*To all whom it may concern:*

Be it known that I, HENRY H. YOUNG, of Newport, in the county of Newport and State of Rhode Island, have invented certain new and useful Improvements in Sewer-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in sewer-traps, and is designed to combine with a sewer of ordinary construction a series of house-traps and street-traps, operated upon substantially the same principle, whereby there is obtained a simple and effective stench-tight system, which I denominate air-tight or entombed sewerage.

In the drawings, Figure 2 presents a sewer, to which is connected one of my improved house-traps, for which I am about to apply for Letters Patent; and Fig. 1, one of my street-traps, as hereinafter specified and claimed, and which two styles of trap form, with the sewer, a system of stench-tight sewerage.

A is a sewer beneath the street B. C is a passage leading thereto from the street-trap D. D is a street-trap, constructed as follows: $d$ is a frame, upon which is hinged at the top the door $d'$, and the latter falls by its own gravity, and closes upon the inclined inner face of the frame $d$. $d''$ are wings that extend from the top to the bottom of the swinging door $d'$, the object being that when the door is opened to permit the water to pass in from the gutter, the water itself will seal the mouth of the valve, and the wings $d''$ will close up the angular opening that would otherwise be formed between the upper surface of the water and the top of the door at the sides of the latter, and will thus prevent the stench from escaping.

The frame $d$, as indicated by the dotted lines, is constructed so that it is very readily set into place.

To set the trap D, it is held in a horizontal position with its bottom in the opening, and the trap is then raised, as shown by dotted lines, into position, and there held by flanges around the edge of the face of the frame, when it will be firmly set; and it can at any time be as easily removed by simply taking hold of the top of the frame, turning it down flat into the gutter, when it can be readily pulled out, and is, therefore, thoroughly portable.

As the trap F forms the subject-matter of another application, it need not be thoroughly described here. It consists of a basin, G, into which the water first passes; thence up through a perforated screen, $f$, into a close cap; thence through the valve that is covered by a gravity trap-door, $f'$, similar to $d'$; and thence into the sewer-connection E down to the main sewer.

In addition to the security given by the trap-door $f$, a water-seal is formed by the standing water in the basin, which rests at a level above the perforated screen $f$.

The street-trap D, in addition to its great simplicity and portability, is presented in such close proximity to the street as to be readily seen and corrected by a policeman or other person should it happen to become clogged by dirt, &c.; and, in the case of the trap F, no matter can reach the trap-door to clog it, and the whole matter can be cleansed by simply cleansing the basin G and the under side of the screen $f$.

It will thus be seen that the two traps herein described and shown, when combined with a sewer, make a simple and effective system, which can be readily kept in order, readily cleansed or removed, and is stench-tight. It will also be seen that, while both these traps admit the water freely, they prevent any back-flow or escape of the stench.

It will generally be best to form a seat in the flagging-stones, so that the flange on the the face of the frame may set into it, and bring the front of the frame flush with the surface, out of the way of carriage-wheels.

What I claim is—

The portable street-trap D, composed of frame $d$, inclined on its inner face, as described, gravity-hinged door $d'$, and side guards or wings $d''$, the whole constructed substantially as set forth, to be set in position by raising it up around its base as an axis, as specified.

In testimony that I claim the foregoing I have hereunto set my hand this 6th day of June, 1874.

HENRY H. YOUNG.

Witnesses:
WELLS W. LEGGETT,
G. J. FERRISS.